Sept. 11, 1973  T. O. LANG ET AL  3,758,371
PLASTIC NET LAMINATE MATERIAL
Filed April 17, 1970  2 Sheets-Sheet 1

INVENTORS.
THEO O. LANG
THOMAS A. LANE

BY

LEONARD S. SELMAN
ATTORNEY.

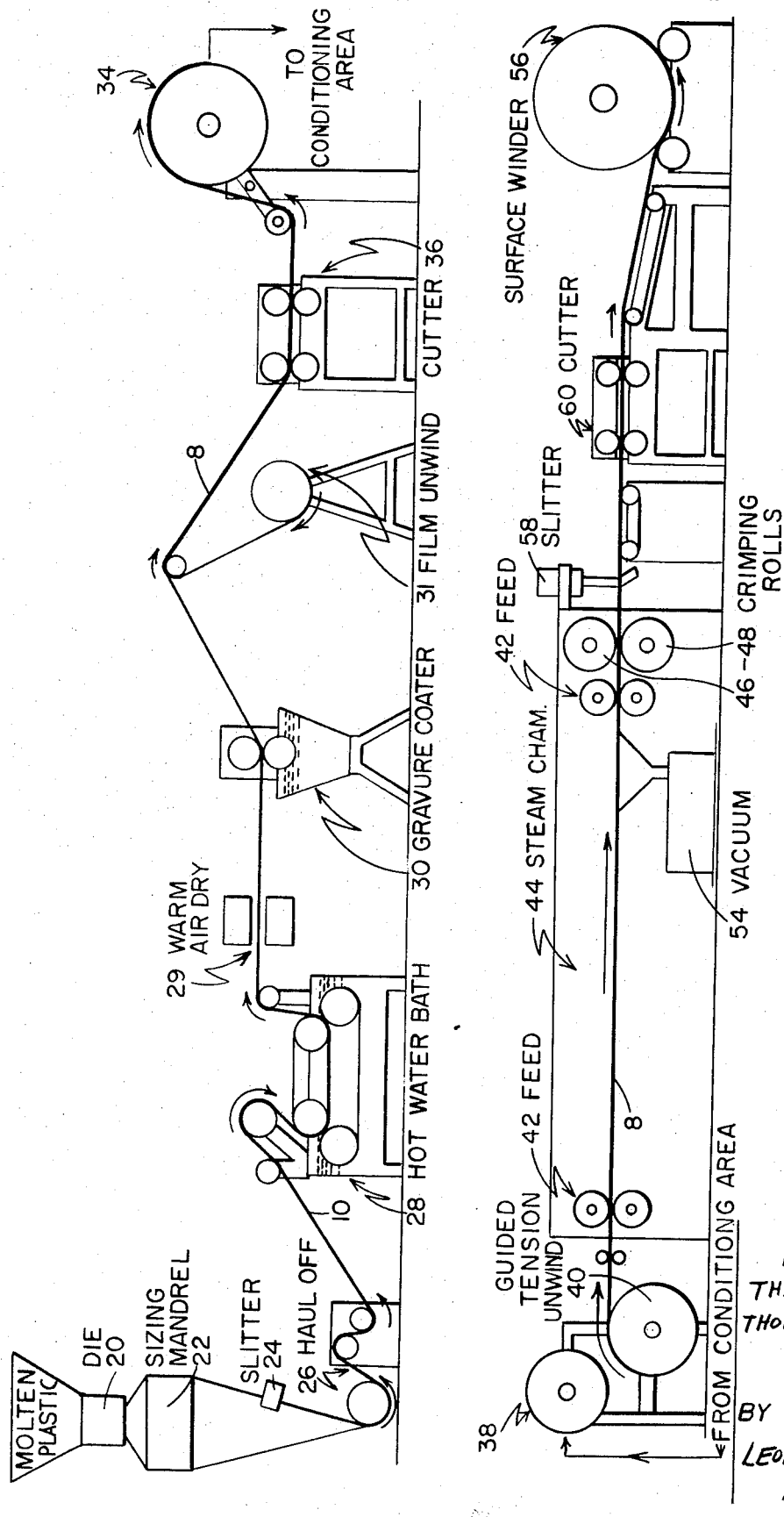

United States Patent Office 3,758,371
Patented Sept. 11, 1973

3,758,371
PLASTIC NET LAMINATE MATERIAL
Theo O. Lang, Leominster, and Thomas A. Lane, East Pepperell, Mass., assignors to Foster Grant Co., Inc., Leominster, Mass.
Filed Apr. 17, 1970, Ser. No. 29,596
Int. Cl. B32b 7/00
U.S. Cl. 161—88　　　　　　　　　　　　2 Claims

ABSTRACT OF THE DISCLOSURE

A laminate material and method of manufacture thereof wherein one of the layers comprises a plastic net made of a foamed or expanded plastic and a layer of preformed continuous sheet material is joined thereto.

---

For some time it has been known to form plastic into a net structure by extrusion of the plastic in a molten state. One method used involves extruding the molten plastic through a pair of dies having orifices which are moved repeatedly into and out of register with one another as described in U.S. Pat. 2,919,467 to Mercer, for example. Many different kinds of plastic may be formed into net in this manner; however, this invention is specifically directed to a plastic net of foamed or expanded plastic such as polystyrene. This material in net form has found many uses and is particularly useful as a packaging material because it has very desirable cushioning properties, is extremely lightweight, inexpensive, and clean.

This plastic net of foamed or expanded plastic, while satisfactory for many uses, is still not satisfactory for certain heavy duty uses, however, which require additional properties. Thus, the present invention includes another preformed integral layer of continuous sheet material which is laminated together with the foam plastic net to provide increased tensile strength, flexibility, tear strength, and puncture resistance. Further, the new laminate material may serve as a moisture barrier as well as a dust barrier to liquids or foreign particles which would otherwise pass through the net openings.

The layers comprising the laminate material cooperate in a unique manner to provide the aforementioned qualities and advantages. Thus, the foam plastic net contributes its cushioning effect, economy, and light weight while the additional layer laminated thereto enhances its tensile strength, flexibility, tear strength, and puncture resistance while also contributing to the cushioning property of the laminate material. The stronger material may be reused many times before it must be disregarded.

Of importance in any laminate material is the prevention of separating of the layers, and the laminate material of the present invention had a particular problem to overcome in this area. Specificallly, the net layer is made of strands of plastic material which are expanded in order to provide their cushioning properties. This expansion of the strands causes them to become puffed and rounded. Thus, a layer of continuous sheet material when applied in the ordinary way to a net layer of such strands which have been coated with adhesive, or the like, comes in contact with and adheres to only the so-called "high spots" or small peripheral portions of the strands, resulting in a laminate material in which the layers are improperly joined and separate easily. The present invention solves this problem by joining the continuous layer to the net layer during the processing of the net layer and while the net strands are relatively flat, so that good adhesion between the layers can be obtained.

Another aspect of the present invention is the requirement that the material be flexible and bendable so that it may, for example, be bent around articles for the purpose of packaging and protecting such articles for shipping or storage, or the like. This can present a particular problem with the laminate material of the present invention since the bending increases the stress between the layers, tending to tear the layers apart or crack the net layer, in particular. It has been found that crimping or compressing this laminate material in zones running along spaced parallel lines extending across the laminate sheet greatly relieves the stress between the layers and allows the material to bend easily when required.

Still nother aspect of the present invention is the provision of such compressed zones in the opposite surfaces of the laminate material; and to even further enhance the bendability of the material these compressed zones are preferably offset rather than being aligned with one another in said surfaces. As will become more evident later, this crimping of the laminate material also aids in assuring a permanent and complete joining of the laminate layers.

This invention is also directed to the method of manufacturing the laminate material, which is also unique in that, as indicated, the plastic net foam layer must be expanded in two expansion steps after extrusion of the foam layer to provide its air-filled structure; and yet, the layer laminated to the net must be joined to the net in a manner and at a time so that the bond between the layers of the material is permanent and complete as possible. Thus, the method is carried out such that the laminating of the net layer with the continuous layer preferably occurs before the strands composing the net layer are expanded to their fullest extent, which occurs after the second expansion step. The aforementioned crimping of the material also occurs after the second expansion step and also, quite critically, after the laminating of the layers. If the laminating of the layers were attempted after the crimping, the compressed zones would be well below the plane of the "high spots" of the strand and would not be contacted at all by the continuous sheet material. The crimping of the two layers of the laminate material already joined also presses the layers together in the crimped or compressed zones, aiding the adhesion therebetween.

Accordingly, it is an object of this invention to provide a laminate material comprising an expanded plastic net layer and another continuous sheet material layer permanently joined thereto.

It is another object of this invention to provide a laminate material comprising an expanded plastic net layer and another continuous sheet material layer permanently joined thereto wherein said laminate material is compressed along spaced and preferably offset zones on opposite sides of the material to increase the flexibility thereof.

It is a further object of this invention to provide a method for bonding or laminating together a layer of expandable plastic net material and another continuous layer of sheet material during the forming and processing of the plastic net, including the expansion thereof, so that the joining of the layers is permanent.

It is still a further object of this invention to provide a method for bonding or laminating together a layer of expandable plastic net and another layer of continuous sheet material including the step of crimping or compressing the laminate material along spaced and preferably offset zones on opposite sides of the material to increase the flexibility thereof.

Other objects of the invention will in part be obvious and will in part appear hereinafter.

The invention accordingly comprises the article of manufacture possessing the features, properties, the relation of components, and the process for the fabrication of said article, which are exemplified in the following detailed disclosure, the scope of the application of which will be indicated in the claims.

For a fuller understanding of the nature and objects of the invention, reference should be had to the following detailed description taken in connection with the accompanying drawings wherein:

FIG. 3 is a schematic representation of the process for manufacturing the laminate material.

Figure 1:
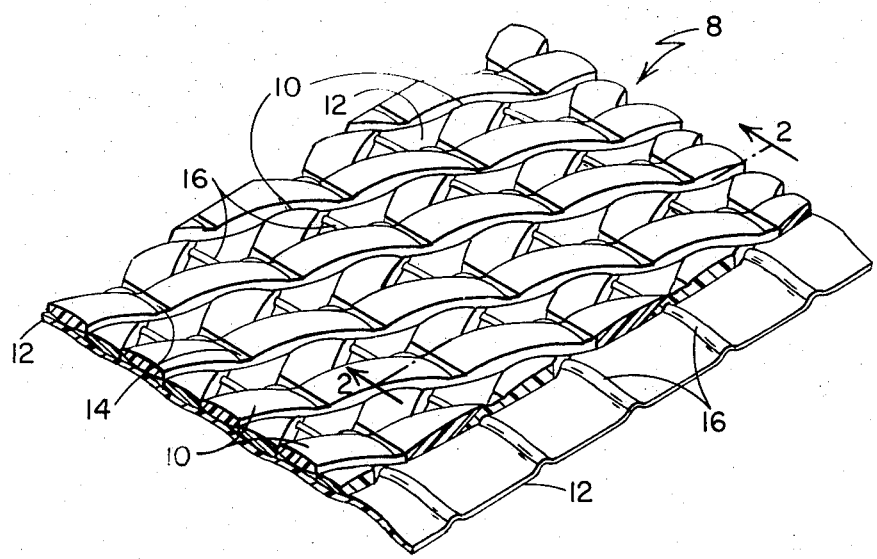
FIG. 1 is a perspective view partially broken away of the laminated material made in accordance with the present invention.

Referring now to the drawings in FIG. 1 there is shown an example of a sheet of laminate material 8 with the first layer 10 partially broken away to expose the second layer 12. The two layers 10 and 12 are bonded together at all points of contact by an adhesive which is preferably of the room temperature setting type. It is obvious, however, that other equivalent adhesives or bonding methods may be used so long as they fulfill the requirement of forming a permanent joining of the two layers of the laminate structure.

The layer 10 as shown in FIG. 1 is a plastic net of foamed or expanded plastic, preferably polystyrene, although other expandable plastics may be used where their specific properties are desired. The layer 12 is preferably a thin flexible continuous preformed integral sheet material such as films of polyethylene, nylon and ionomer or other similar materials. The use of a heat sealable plastic film is advantageous since the ends or parts of the film may be sealed together to enclose various objects to be protected. Thus, a laminate structure consisting of foam polystyrene net and 1 mil thickness low density heat sealable polyethylene film would be suitable for packaging a large variety of objects, such as electronic equipment, machine parts, laboratory glassware, and furniture. A laminate consisting of foam polystyrene net and 2 mil thickness ionomer film would be suitable for packaging sharp pointed objects, such as scissors and knives. Water resistant paper or metal foil might also be used in place of the plastic films for use in certain environments, such as where corrosion protection in addition to cushioning properties is desired.

Figure 2:
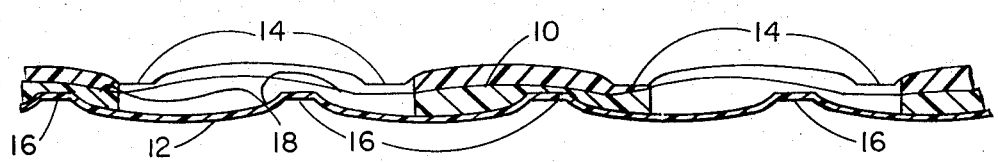
FIG. 2 is a sectional view taken on line 2—2 of FIG. 1.

For all or most of these packaging and other uses it is necessary that the laminate sheet material be flexible so that it can be bent around objects, for example, without cracking or tearing or separation of the layers. For this purpose it is an important aspect of the present invention to provide spaced crimped or compressed zones running along parallel lines extending across the laminate material 8. In FIG. 1 the compressed zones are indicated by reference numeral 14, and in FIG. 2 it can be seen that there are similar compressed zones 16 on the opposite side of the material offset or spaced from zones 14 approximately the width of one compressed zone and parallel thereto. The width and spacing of the compressed zones will depend on the flexibility required and the gauge and mesh of the layer 10, as well as the thickness and flexibility of the film or layer 12. In those zones of the expanded plastic net that are compressed or crimped the relatively inflexible cellular structure resulting from the foaming treatment of the plastic is crushed and collapsed. Thus, the compressed zones form flexure or hinge lines spaced across both sides of the laminate sheet, allowing the sheet to bend easily. The offsetting of these zones further increases the flexibility of the laminate sheet, since the offsetting is such, as shown in FIG. 2, that a flexure area 18 easily bendable in both directions is formed between the side edges of the compressed zones formed in opposite sides of the sheet. The offset crimping of the laminate material also contributes to its cushioning property since the undulating formation of the material provides a spring-like action which will "give and come back" and therefore is useful in absorbing both static and impact forces applied thereagainst.

The preferable method of forming the laminate sheet material is illustrated schematically in FIG. 3. The formation of the plastic net layer 10 is accomplished by the apparatus and method disclosed in U.S. Pat. 2,919,467 to Mercer wherein the plastic material is extruded in a molten state through a relatively coaxial rotary die carrying members indicated by reference numeral 20 in FIG. 3. The oppositely rotating dies have orifices which are moved repeatedly into and out of register with one another to form the intersections and legs of the net. With the use of such rotary dies the plastic net is produced in tubular form, but the tubular form may be slit longitudinally to provide a flat fabric having a longitudinal direction in the direction of extrusion as is known in tubular fabric production. This occurs in FIG. 3 wherein the net 10 is pulled over a sizing mandrel 22 and slit by knife 24 and unfolded as it is removed by haul-off mechanism 26. The plastic net layer may also be extruded as a flat layer by means of rectilinear reciprocating dies as described in the above cited Mercer patent. The processing of the expandable polystyrene plastic net then requires a first stage expansion step and a second stage expansion step. These expansions take place after or post forming of the net and are thus known in the art as post expansions. The first stage expansion step is indicated in FIG. 3 wherein the net 10 is passed through a hot water bath 28. This causes expansion of the material by causing a release of gas by means of a blowing agent inside the material to form hollow cells therein. After the first stage expansion and drying at station 30, it has been found that the net strands are still relatively flat and full adhesion of the plastic film 12 to the plastic net material 10 may be accomplished as shown in FIG. 3 by the gravure type coater 28 which rolls a layer of adhesive onto the plastic net 10. The film material 12 is then fed from a roll 30 over a roller 32 where it is pressed against the adhesive coated net 10 with a controlled amount of pressure. The laminated material is then rolled up at station 34, a cutter 36 severing the desired lengths of material. In contrast, if the adhesive bonding of the plastic film 12 to the plastic net is delayed until after the second expansion, the net strands are no longer flat but become puffed and rounded. Adhesion is then obtained only on the high spots or small peripheral portions of the strands, resulting in inferior joining of the two layers. Further, if the net layer should be crimped to increase its flexibility prior to laminating, the problem is even further aggravated, since the crimped or compressed areas are well below the plane of the high spots of the strands and most of the available net area is not adhered to the plastic film. A material where the continuous layer is adhered to mainly the high spots of the net strands is unduly stiff and tears more easily.

As shown in FIG. 3, after the material 8 is laminated, it is sent to a conditioning area where the adhesive is allowed to set. During this conditioning the cells formed in the material during the first expansion will also be filled with air through the process of permeation, the air replacing the cell forming gas released by means of the blowing agent.

After conditioning the roll of laminate material is placed at station 38 and an unwinding mechanism 40 will guide the laminate material to a feed mechanism 42 which feeds the material through a steam tunnel 44 where the second stage expansion of the expandable plastic net material takes place. The net strands, as noted, tend to round out as the air is expanded by the heat of the steam inside the cells within the material. The hot steam also drives out any remaining solvent in the adhesive, thus insuring a strong permanent bond between the layers 10 and 12. As an alternate, lamination of the foam net and continuous sheet material may be accomplished just prior to the steam tunnel 44.

Figure 4:
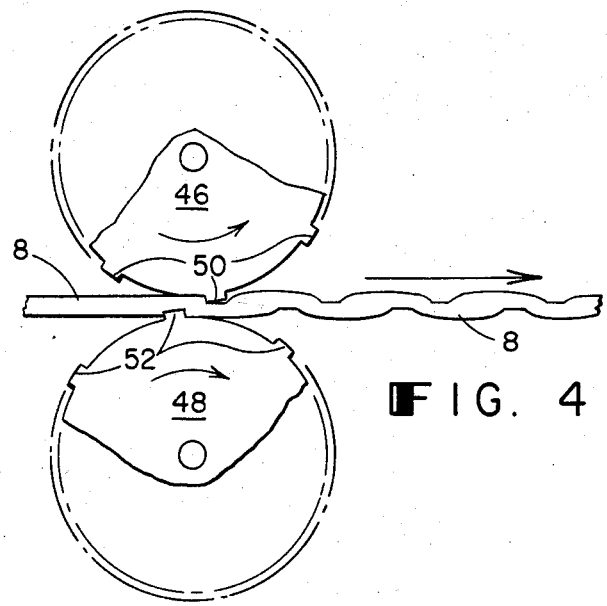
FIG. 4 is a schematic representation of suitable apparatus for crimping the laminate material.

After the second expansion the laminate material is passed between a pair of crimping rolls 46 and 48 having offset crimping teeth 50 and 52 as shown in FIG. 4, which produce the compressed zones 14 and 16 shown in FIGS. 1 and 2. The crimping thus strongly pressed the layers 10 and 12 together in those compressed zones and pulls the layers together in the areas between the zones, making an even stronger laminate structure. Just before crimping, any excess water condensed on the laminate material from the steam chamber is removed by vacuum means 54. Before crimping, many more passages between the laminated layers are still open, allowing the water to be more easily drawn off. The laminate material 8 is then rolled up on surface winder 56, and slitter 58 and cutter 60 may also be employed to cut the material into desired widths and lengths.

With the above described process, at least about 25 percent of the available net surface area on one side of the net layer is joined with the continuous sheet layer. In comparison, if the continuous sheet material is joined to the net layer after both the second stage expansion step and the crimping step take place, less than about 12 percent of the aforementioned available net surface area is joined with the continuous sheet. The available net surface area is defined as that surface area which is exposed on the one side of said mesh layer to which the continuous sheet material layer is joined. Thus at least about twice as much net surface area is permanently bonded to the continuous sheet using the process or method of the present invention which reduces the likelihood of delamination while strengthening the laminated material.

Because of the increased cost in material and manufacturing expense in producing this laminated material it is necessary that minimum tensile strengths and impact strengths are obtained to gain the advantages over existing packaging materials, for example. Thus the minimum preferred tensile strength in the longitudinal or extrusion direction is about 4 pounds per square inch, and the minimum preferred impact strength as measured by the well-known Dart Drop Test is 11 grams. It is the excellent bonding of the layers obtained by the disclosed method of laminating that makes it possible to obtain these levels of tensile and impact strength with a layer of expanded polystyrene net material with a density of about 0.5 to 1.0 pound per cubic foot and strands of a width of about .125 of an inch joined to a layer of a low density polyethylene film about .001 of an inch in thickness.

Another specific example of laminate material contemplated includes a medium weight layer of expanded net material with a density of about 0.5 to 1.0 pound per cubic foot and strands of a width of about .188 inches joined to a layer of low density polyethylene film of .001 of an inch in thickness. With the disclosed method of laminating this example of material a minimum tensile strength of about 10 pounds per square inch in the direction of extrusion is obtained as well as a minimum impact strength, as measured by the well-known Dart Drop Test, of at least 13 grams.

Still another specific example of laminate material contemplated includes a heavyweight layer of expanded net material with a density of about 0.5 to 1.0 pound per cubic foot and strands of a width of about .250 inches joined to a layer of low density polyethylene film of .001 of an inch in thickness. With the disclosed method of laminating this example of material a minimum tensile strength of about 18 pounds per square inch in the direction of extrusion is obtained, as well as a minimum impact strength of at least 17 grams as measured by the well-known Dart Drop Test.

It is contemplated that in certain instances one may wish to laminate the layers 10 and 12 after the first and second stage expansions of the expandable plastic material comprising the net layer but before the crimping step. In this case, although the initial contact of the layers may be primarily on the high spots of the net layer strands, the crimping step, especially if it is performed almost immediately after the laminating step, will mechanically push and pull the laminate layers into close contact, and good adhesion between the layer may still be obtained upon setting of the adhesive used to join the layers.

It is further contemplated that the laminating of the layers may occur after extrusion of the strands of the net layer but before the first stage expansion thereof. In this case the net layer would present a substantially flat surface which will provide good contact between the layers when the continuous layer 12 is pressed against the net layer 10 after coating with the adhesive. A waterproof adhesive or the like may be used to join the layers, which would still allow the use of a hot water bath for the first stage expansion or infrared heaters might be used instead.

While the hot water bath and steam chamber are preferred for performing the first stage and second stage expansions of the foamed plastic net material, other heating devices such as infrared heaters or the like could be used for one or both of these expansions.

The term "permanent" as applied to the bond between the layers 10 and 12 refers to the inability of separating the layers without destroying the integrity of the plastic net layer.

It is recognized that a third layer of plastic film, or the like, could be bonded to the exposed side of the net layer if desired; however, this has been found unnecessary in most uses and of course the two-layer laminate material is encompassed by the three-layer material.

The U.S. Pat. 3,012,275 to Nalle, Jr. describes another method and plastic net produced thereby which is suitable for use as the net layer in the laminate material described herein. The term "net intersections" in the claims is used in its broad sense as a place where two or more strands cross or join in any manner and includes the structure as shown in FIG. 16 of the above Nalle patent.

Since certain changes may be made in the above article and process without departing from the scope of the invention herein involved, it is intended that all matter contained in the above description or shown in the accompanying drawings shall be interpreted as illustrative and not in a limiting sense.

What is claimed is:

1. A laminate material comprising:
   an extruded and expanded thermoplastic polystyrene foam net layer having a density of about 0.5 to 1.0 pound per cubic foot and consisting of at least twice post expanded net strands and net intersections, said strands and intersections having generally rounded surface portions due to the multiple post expansion thereof; and
   a thin continuous sheet of preformed heat sealable polyethylene film permanently bonded to said rounded surface portions of said strands and intersections of said thermoplastic polystyrene foam net layer;
   said film being bonded to at least about 25 percent of the available net surface area on one side of said net layer, said bonding and said layered structure providing said material with a tensile strength in the extrusion direction of at least 4 pounds per square inch and an impact strength as measured by the Dart Drop Test of at least about 11 grams;
   said laminate material including compressed zones on both sides of said material, said compressed zones on one side of the material being offset from those on the opposing side, said zones on each side of said material being spaced from one another and extending along parallel lines and providing flexure lines in the material along which expanded cells therein of the net layer are crushed and do not interfere with the bending thereof, the intervening net portions between the compressed zones of the net layer remaining in their twice expanded noncompressed condition and the compression zones especially being areas of permanent bonding between the layers of the laminate material.

2. The laminate material as described in claim 1 wherein the compressed zones on one side of said material are spaced and offset from those on the other side a distance approximately equal to the width of one compresed zone.

References Cited

UNITED STATES PATENTS

| | | | |
|---|---|---|---|
| 3,553,070 | 1/1971 | Sparks | 161—160 |
| 3,392,080 | 7/1968 | Mercer | 161—124 X |
| 3,424,645 | 1/1969 | Ohsol | 161—178 X |
| 3,378,432 | 4/1968 | Spencer | 161—123 X |
| 3,210,466 | 10/1965 | Yamakawa et al. | 161—89 X |

FOREIGN PATENTS 1,021,622  3/1966  Great Britain.

GEORGE F. LESMES, Primary Examiner

E. P. ROBINSON, Assistant Examiner

U.S. Cl. X.R.

161—89, 92, 123, 124, 160, 178, Dig. 4; 156—79, 290